US011306242B2

(12) United States Patent
Tashiro et al.

(10) Patent No.: US 11,306,242 B2
(45) Date of Patent: Apr. 19, 2022

(54) DEGRADATION AGENT FOR VISCOUS FLUID AND METHOD FOR PRODUCING SAID DEGRADATION AGENT

(71) Applicant: MITSUBISHI GAS CHEMICAL COMPANY, INC., Tokyo (JP)

(72) Inventors: Norifumi Tashiro, Tokyo (JP); Katsuyuki Murai, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 17/252,519

(22) PCT Filed: Aug. 1, 2019

(86) PCT No.: PCT/JP2019/030112
§ 371 (c)(1),
(2) Date: Dec. 15, 2020

(87) PCT Pub. No.: WO2020/036068
PCT Pub. Date: Feb. 20, 2020

(65) Prior Publication Data
US 2021/0261856 A1 Aug. 26, 2021

(30) Foreign Application Priority Data
Aug. 13, 2018 (JP) .............................. JP2018-152244

(51) Int. Cl.
*C09K 8/70* (2006.01)
*C01G 49/14* (2006.01)
(52) U.S. Cl.
CPC .............. *C09K 8/706* (2013.01); *C01G 49/14* (2013.01); *C09K 2208/26* (2013.01)

(58) Field of Classification Search
None
See application file for complete search history.

(56) References Cited

U.S. PATENT DOCUMENTS 4,741,401 A  5/1988 Walles et al.
5,684,106 A * 11/1997 Johnson ................. A61L 15/60
                                                526/295
(Continued)

FOREIGN PATENT DOCUMENTS

CN   110055048 A   7/2019
JP    5745705 B2    7/2015
(Continued)

OTHER PUBLICATIONS

International Search Report issued in International Patent Application No. PCT/JP2019/030112, dated Nov. 5, 2019 and English Translation thereof.
(Continued)

*Primary Examiner* — John J Figueroa
(74) *Attorney, Agent, or Firm* — Greenblum & Bernstein, P.L.C.

(57) ABSTRACT

A degradation agent for viscous fluids to be used in hydraulic fracturing methods is provided according to one aspect of the present invention, the degradation agent comprising a persulfate and an iron salt serving as an activator for the persulfate, wherein the persulfate and the iron salt have been coated and the ratio of the coating-film thickness (Y) in the iron salt to the coating-film thickness (X) in the persulfate, Y/X, is in the range of 0.35 to 1.0. The degradation agent for viscous fluids has properties suitable for use in hydraulic fracturing methods.

10 Claims, 1 Drawing Sheet

(56) References Cited

U.S. PATENT DOCUMENTS

| | | |
|---|---|---|
| 10,240,445 B2 | 3/2019 | Ido et al. |
| 2006/0148658 A1* | 7/2006 | Hanes, Jr. ................ C09K 8/64 |
| | | 507/209 |
| 2009/0061082 A1* | 3/2009 | Swearingen ............. B01J 13/22 |
| | | 427/220 |
| 2009/0221453 A1 | 9/2009 | Mukhopadhyay et al. |
| 2014/0187451 A1* | 7/2014 | Tamsilian ............. C08F 265/06 |
| | | 507/213 |
| 2018/0134949 A1* | 5/2018 | Monastiriotis ......... C09K 8/805 |
| 2018/0208832 A1 | 7/2018 | Homma et al. |

FOREIGN PATENT DOCUMENTS

| | | |
|---|---|---|
| JP | 2017-206569 A | 11/2017 |
| WO | 2017/022681 A1 | 2/2017 |

OTHER PUBLICATIONS

Written Opinion of The International Searching Authority issued in International Patent Application No. PCT/JP2019/030112, dated Nov. 5, 2019 and English Translation thereof.

* cited by examiner

DEGRADATION AGENT FOR VISCOUS FLUID AND METHOD FOR PRODUCING SAID DEGRADATION AGENT

TECHNICAL FIELD

The present invention relates to a degradation agent for a viscous fluid that is used in a hydraulic fracturing method, and to a method for producing said degradation agent. The present invention also relates to a method for degrading a viscous fluid by using said degradation agent. The present invention further relates to a viscous fluid which is used in a hydraulic fracturing method comprising said degradation agent.

BACKGROUND ART

While a hydraulic fracturing method has conventionally been employed for extracting conventional resources such as crude oil and natural gas, a hydraulic fracturing method has recently become available for extracting unconventional resources (shale gas, shale oil, etc.) owing to recent technological innovations. A hydraulic fracturing method is a technique that involves high-pressure injection of a water-based fluid to open a crack (fracture) in the extraction layer underground, and to collect the resource via the fracture. The fluid used for injection contains a particulate support material (proppants) such as sand for preventing the fracture from closing, and further a gelling agent to ensure that the proppants are sent into the fracture. Specifically, the fluid used for a hydraulic fracturing method is a viscous fluid containing proppants. Such a viscous fluid needs to have viscosity that allows an adequate fracture to be formed in the extraction layer and the proppants to be sent into the fracture.

Meanwhile, in order to collect the resource such as shale oil after forming the fracture, the gel portion of the viscous fluid needs to be collected from the fracture since the presence of the gel in the fracture deteriorates the efficiency of collecting the resource. In a method generally employed for collecting the gel, the viscous fluid is degraded to reduce the viscosity prior to collection. While the viscous fluid may be degraded by sending a gel degradation agent (gel breaker) to the fracture subsequent to opening the fracture, it is preferable, in terms of improving the operation efficiency, to mix the viscous fluid with a gel breaker in advance so that the gel breaker activates at a desired timing after the fracture opening to reduce the viscosity of the viscous fluid. Specifically, the viscous fluid is preferably designed to have sufficiently high viscosity upon opening a fracture, which can be reduced upon collecting the gel. For example, Patent document 1 discloses a viscosity-controlling agent for a viscous fluid used in a hydraulic fracturing method, wherein the agent is a tablet comprising polyalkylene oxide and a viscosity-reducing agent. In addition, the document describes that this viscosity-controlling agent can be used to maintain the viscosity of the viscous fluid high upon opening a fracture and to reduce the viscosity of the fluid upon collecting the gel.

In order to provide a viscous fluid that has the above-described desirable characteristics, kinds and combinations of gelling agents and gel breakers and also activators of the gel breakers have been studied. For example, Patent documents 2-4 disclose combinational use of a gel breaker and an activator, where examples of gel breakers that can be used include a persulfate, a peroxide, a perborate and an oxoacid. Extraction for unconventional resources is still in the process of development and thus further studies on compositions and materials of a viscous fluid having characteristics suitable for a hydraulic fracturing method are required. In particular, a viscous fluid that allows rapid viscosity reduction at a desirable timing is favorable in terms of operation efficiency and else.

PRIOR ART DOCUMENTS

Patent Documents

Patent document 1: JP-B-5745705
Patent document 2: JP-A-2017-206569
Patent document 3: US-A-2006/0148658
Patent document 4: US-A-2009/0221453

SUMMARY OF INVENTION

Problem to be Solved by the Invention

The present invention has an objective of providing a degradation agent for a viscous fluid which has characteristics suitable for a hydraulic fracturing method.

Means for Solving the Problem

The present inventors have gone through intensive studies, and as a result of which found that, where a persulfate is used as a gel breaker and an iron salt is used as an activator, the above-described problem can be solved by coating each of the persulfate and the iron salt to a prescribed film thickness to use them in a degradation agent for a viscous fluid, thereby accomplishing the present invention. The present invention is, for example, as follows.

[1] A degradation agent for a viscous fluid used in a hydraulic fracturing method, the agent comprising a persulfate and an iron salt as an activator of said persulfate, wherein:
  each of the persulfate and the iron salt is coated; and
  the ratio (Y/X) of the coating-film thickness of the iron salt (Y) to the coating-film thickness of the persulfate (X) is in the range of 0.35 to 1.0.
[2] The degradation agent according to [1], wherein the persulfate is ammonium persulfate, sodium persulfate or potassium persulfate.
[3] The degradation agent according to [1] or [2], wherein the iron salt is an aqueous iron salt.
[4] The degradation agent according to [3], wherein the aqueous iron salt is ferrous sulfate, ferric sulfate, ammonium iron(II) sulfate or a hydrate thereof.
[5] A method for producing a degradation agent for a viscous fluid used in a hydraulic fracturing method, the method comprising the steps of:
  coating a persulfate to obtain a coated persulfate;
  coating an iron salt to obtain a coated iron salt; and
  mixing the coated persulfate and the coated iron salt.
[6] The method according to [5], wherein the ratio (Y/X) of the coating-film thickness of the iron salt (Y) to the coating-film thickness of the persulfate (X) is in the range of 0.35 to 1.0.
[7] The method according to [5] or [6], wherein the persulfate is ammonium persulfate, sodium persulfate or potassium persulfate.
[8] The method according to any one of [5] to [7], wherein the iron salt is an aqueous iron salt.

[9] The method according to [8], wherein the aqueous iron salt is ferrous sulfate, ferric sulfate, ammonium iron(II) sulfate or a hydrate thereof.

[10] A method for degrading a viscous fluid used in a hydraulic fracturing method, the method comprising a step of adding a coated persulfate and a coated iron salt as an activator of said persulfate to the viscous fluid,
wherein the ratio (Y/X) of the coating-film thickness of the iron salt (Y) to the coating-film thickness of the persulfate (X) is in the range of 0.35 to 1.0.

[11] A viscous fluid used in a hydraulic fracturing method, the viscous fluid comprising a solvent, a gelling agent and the degradation agent according to any one of [1] to [4].

[12] Use of a degradation agent for a viscous fluid in a hydraulic fracturing method, wherein:
the degradation agent comprises a persulfate and an iron salt as an activator of said persulfate;
each of the persulfate and the iron salt is coated; and
the ratio (Y/X) of the coating-film thickness of the iron salt (Y) to the coating-film thickness of the persulfate (X) is in the range of 0.35 to 1.0.

Effect of the Invention

The present invention can provide a degradation agent for a viscous fluid which has characteristics suitable for a hydraulic fracturing method.

MODES FOR CARRYING OUT THE INVENTION

Hereinafter, an embodiment of the present invention will be described. Herein, materials, structures and the like described below are not provided to limit the present invention, and they can be modified variously within the scope of the present invention.

A degradation agent of the present invention (hereinafter, also referred to as a "gel degradation agent") is used for degrading a viscous fluid that is used in a hydraulic fracturing method. While the resource extracted by the hydraulic fracturing method is not particularly limited, the degradation agent of the present invention can favorably be used for extracting tight oil, shale oil, shale gas and the like, in particular, for extracting shale oil. The degradation agent of the present invention comprises a persulfate and an iron salt as an activator of the persulfate, wherein each of the persulfate and the iron salt is coated. In addition, the ratio (Y/X) of the coating-film thickness of the iron salt (Y) to the coating-film thickness of the persulfate (X) is in the range of 0.35 to 1.0.

As described above, according to a hydraulic fracturing method, once a fracture is opened, viscosity of the viscous fluid is reduced to collect the gel portion from the fracture. In doing so, a gel degradation agent is used to reduce the viscosity of the viscous fluid. While the gel degradation agent may be added by sending the gel degradation agent to the fracture subsequent to opening the fracture, a viscous fluid that is pre-mixed with a gel degradation agent may be used upon opening a fracture. From the viewpoint of improving the operation efficiency, a viscous fluid is preferably mixed with a gel degradation agent in advance. Since, however, the viscous fluid is required to have high viscosity upon sending a support material (proppants) into the fracture, the gel degradation agent needs to be designed such that the viscosity of the viscous fluid is maintained upon opening a fracture but can be reduced through the action of the gel degradation agent after the fracture is opened.

The present inventors studied and found that, when a persulfate was directly used (without coating) as a gel breaker, it exerts its gel degrading effect immediately after it is added and thus was not suitable to be pre-mixed with a viscous fluid used in a hydraulic fracturing method. The same problem occurred when an iron salt as an activator was used in combination with the persulfate. When the persulfate was coated with a resin or the like in order to delay the effect of the gel degradation agent, the present inventors succeeded in maintaining the viscosity for a predetermined time but a significant amount of gel residue was left after the gel degradation, causing a new problem. Since the gel residue attaches to the proppants, the presence of the gel residue deteriorates the efficiency of extracting a resource such as shale oil. Thus, the amount of the gel residue after degradation of the viscous fluid is preferably small. The present inventors have gone through further studies, and as a result of which found that the amount of the gel residue can be reduced by using a persulfate in combination with an iron salt as an activator rather than the persulfate alone. Meanwhile, when an uncoated iron salt is used in combination with a coated persulfate, the iron salt was found to turn into an iron hydroxide and precipitates before the persulfate exerts its effect and thus cannot serve as an activator of the persulfate.

Accordingly, the present inventors studied the use of a persulfate and an iron salt that were both coated with a resin or the like. As a result, the present inventors further found that while a combination of the persulfate and the iron salt reduced the amount of the gel residue, the effect of the persulfate tended to manifest faster. In order to fully gain the gel degrading effect, it is desirable that the persulfate and the iron salt exert their effects at the same timing. Thus, the present inventors solved the above-described problem by making the ratio of the coating-film thicknesses of the persulfate and the iron salt to lie within a predetermined range. Specifically, the ratio (Y/X) of the coating-film thickness of the iron salt (Y) to the coating-film thickness of the persulfate (X) is in the range of 0.35 to 1.0, preferably in the range of 0.4 to 0.9, more preferably in the range of 0.4 to 0.7 and particularly preferably in the range of 0.4 to 0.5. By making the ratio of the coating-film thicknesses to lie within the above-mentioned range, the persulfate and the iron salt can exert their effects generally at the same timing. The time that takes before the effects exhibit can be controlled by varying the coating-film thickness of each of the persulfate and the iron salt within the above-mentioned coating-film thickness range. Herein, the coating-film thickness can be measured utilizing a SEM image or the like by collecting only the coating film from the coated persulfate and iron salt particles, and refers to an average film thickness of the coating films of the plurality of coated particles measured.

Furthermore, the present invention is capable of reducing the gel residue rate. Herein, a gel residue rate refers to a proportion of the amount of gel remaining after a viscous fluid is degraded to the amount of the gel before degradation, and can be calculated according to the method described in Test Example 1 under "EXAMPLES" below.

Moreover, considering the operation efficiency, the time that takes from the start to the end of the gel degradation is preferably as short as possible. In other words, the viscosity of the viscous fluid is preferably reduced rapidly. The present invention is also capable of solving this problem. Specifically, when a gel degradation agent of the present invention is used, the viscosity-reducing rate during any one hour between addition of the gel degradation agent to the end of degradation is 65% or more (for example, 65 to 90%, 65 to 80%), 70% or more (for example, 70 to 90%, 70 to 80%) or 75% or more (for example, 75 to 90%, 75 to 80%). Herein, any one hour between addition of the gel degradation agent to the end of degradation usually refers to one hour during which the amount of viscosity reduction became maximum among the entire measurement time. The viscosity-reducing rate refers to a proportion of the viscosity reduced during any one hour between addition of the gel degradation agent to the end of degradation with respect to the early viscosity (viscosity prior to addition of the degradation agent). Specifically, the viscosity-reducing rate from Hour x to Hour (x+1) following addition of the degradation agent can be calculated according to the following equation. Herein, x refers to a specific time point between addition of the degradation agent to the end of degradation.

$$\text{Viscosity-reducing rate (\%)} = \{(\text{Viscosity after } x \text{ hours}) - (\text{Viscosity after}(x+1)\text{hours})/\text{Viscosity prior to addition of degradation agent}\} \times 100$$

Hereinafter, the structures of the degradation agent and else of the present invention will be described in detail.

1. Persulfate

A persulfate used in the present invention is not particularly limited as long as it is useful as a gel breaker. Examples of the persulfate include ammonium persulfate, sodium persulfate and potassium persulfate, where ammonium persulfate, sodium persulfate and potassium persulfate are preferable and ammonium persulfate is more preferable. One or more of them may be used alone or in combination.

The particle size (median size) of the persulfate prior to coating is preferably 100 to 1,000 μm, more preferably 200 to 900 μm and particularly preferably 300 to 800 μm. A persulfate having a particle size close to the particle size of the proppants can be used so that the persulfate can be uniformly dispersed inside the fracture. While particles having a particle size (median size) in the range of 100 to 2000 μm are generally used as the proppants, the particle size is preferably uniform so that they can be sent uniformly inside the fracture. The particle size (median size) of the proppants is preferably 100 to 1500 μm, more preferably 100 to 1,000 μm and particularly preferably 200 to 800 μm.

Herein, the median size of the particles is calculated according to the following method. First, the particles are sorted using sieves with mesh sizes of 355 μm, 425 μm, 600 μm, 850 μm, 1,000 μm and 1,180 μm. For each sieve, the mass percentage of the particles that passed through the sieve was determined to calculate the weight-based median size ($D_{50}$) according to the following equation.

$$Z = \log X + (\log X - \log Y) \times (50 - N(X))/(N(Y) - N(X))$$
$$D_{50} = 10^Z$$

$D_{50}$: Weight-based median size
X: Maximum sieve size (μm) where the ratio of all particles that passed through the sieve was 50% or less
Y: Minimum sieve size (μm) where the ratio of all particles that passed through the sieve was 50% or more
N(X): Cumulative distribution (%) when X
N(Y): Cumulative distribution (%) when Y While a persulfate described above can be coated with a coating material, any material can be used as such a coating material as long as it can delay elution of the persulfate, where a high-molecular compound is favorable. In order to fully bring out the effect of the persulfate at desired timing, the entire surface of the persulfate is preferably coated. Specifically, the surface of the persulfate is preferably not exposed outside. Examples of high-molecular compounds that can be used include polyurethane, polyester, polyacrylate (for example, "VONCOAT" available from DIC Corporation), polyvinyl alcohol, polystyrene, polyethylene, polypropylene, polyvinyl chloride, polyvinylidene chloride, polysulfide, polybutadiene, nylon, an acrylonitrile-butadiene-styrene copolymer, cellulose, gelatin, an isocyanate adduct of polyol, a vinylidene chloride-methyl acrylate copolymer (for example, "Saran PVDC latex" available from Asahi Kasei Corporation), and a styrene-butadiene copolymer. In addition, wax, dry oil and the like can also be used. Among others, the coating material is preferably a vinylidene chloride-methyl acrylate copolymer or polyacrylate. Polyacrylate is particularly preferably a resin produced using styrene, α-methylstyrene, methyl methacrylate, 2-ethylhexyl acrylate or acrylic acid. In general, these coating materials are dissolved or dispersed in a medium such as water to give a coating solution. One or more coating materials can be used alone or in combination.

Other than the above-described coating material, an additive that can generally be contained in a coating solution may also be added to the coating solution. Examples of such a material include silica, talc, titanium dioxide, calcium carbonate, barium sulfate and calcium sulfate, and two or more of them may be contained in the solution.

While the coating method is not particularly limited as long as the surface of the persulfate can be coated, spray coating or the like can be employed. When coating is performed by spray coating, the coating-film thickness can be controlled by spray velocity, spray time and the like. For example, coating can be performed by applying a spray solution through a spray nozzle while using a fluidized bed system to cause the particles to form a fluidized bed in the fluidized bed container by hot air from the bottom of the fluidized bed.

The coating-film thickness of the persulfate is preferably 10 to 100 μm, more preferably 15 to 80 μm and particularly preferably 20 to 60 μm. Considering its ratio to the coating-film thickness of the iron salt, the coating-film thickness of the persulfate can be varied within the above-mentioned range so as to more suitably control the elution time of the persulfate. In turn, the time of the gel degradation agent to exert its effect can suitably be controlled. Herein, a coating-film thickness can be measured by collecting only the coating film from the coated persulfate particles and utilizing an SEM image or the like, and it refers to an average film thickness of the coating film measured for a plurality of coated particles.

The mass ratio of the persulfate and the coating material (Mass of persulfate: Mass of solid content in coating solution) is preferably 25:2 to 2:1, more preferably 25:3 to 5:2 and particularly preferably 25:4 to 10:3.

In addition, the proportion of the coating-film thickness of the persulfate to the median size of the coated persulfate particle (Coating-film thickness/Median size of coated particle) is preferably 0.001 to 0.300, more preferably 0.005 to 0.200, still more preferably 0.010 to 0.100, yet still more preferably 0.015 to 0.090 and particularly preferably 0.020 to 0.080.

2. Iron Salt

An iron salt is added as an activator of the persulfate. As described above, an iron salt can be combined to reduce the amount of gel residue remaining after degradation of the viscous fluid. As a result, the resource of interest can be extracted efficiently. While any iron salt can be used as long as it serves as an activator of the persulfate, it is preferably an aqueous iron salt. Examples of an aqueous iron salt include ferrous sulfate, ferric sulfate, ammonium iron(II) sulfate, iron(II) chloride, iron(III) chloride, iron(III) nitrate, iron(III) citrate, ammonium iron(III) citrate, iron(II) gluconate, ethylenediaminetetraacetic acid iron(III) sodium salt and a hydrate thereof, where it is preferably ferrous sulfate, ferric sulfate, ammonium iron(II) sulfate or a hydrate thereof, and more preferably ferrous sulfate or a hydrate thereof (for example, ferrous sulfate heptahydrate). One or more of them may be used alone or in combination.

The particle size (median size) of the iron salt prior to coating is preferably 100 to 1,000 μm, more preferably 200 to 900 μm and particularly preferably 300 to 800 μm. By using an iron salt having a particle size close to the particle size of the proppants, the iron salt can be dispersed more uniformly inside the fracture. Here, the median size can be calculated as described above for the persulfate.

While any coating material can be used for coating the iron salt as long as it can delay elution of the iron salt, a material similar to the coating material of the persulfate may be used. Additives and a coating method are also the same as the persulfate. The types of the coating materials used for the persulfate and the iron salt may be either the same or different, but preferably the same.

The coating-film thickness of the iron salt is preferably 10 to 100 μm, more preferably 10 to 60 μm and particularly preferably 12 to 50 μm. Considering its ratio to the coating-film thickness of the persulfate, the coating-film thickness of the iron salt can be varied within the above-mentioned range so as to more suitably control the elution time of the iron salt. In turn, the time of the gel degradation agent to exert its effect can suitably be controlled. Herein, a coating-film thickness can be measured by collecting only the coating film from the coated iron salt particles and utilizing an SEM image or the like, and it refers to an average film thickness of the coating film measured for a plurality of coated particles.

The mass ratio of the iron salt and the coating material (Mass of iron salt: Mass of solid content in coating solution) is preferably 25:2 to 2:1, more preferably 25:2 to 10:3 and particularly preferably 25:3 to 25:7.

In addition, the proportion of the coating-film thickness of the iron salt to the median size of the coated persulfate particle of the iron (Coating-film thickness/Median size of coated particle) is preferably 0.001 to 0.300, more preferably 0.005 to 0.200, still more preferably 0.010 to 0.100, yet still more preferably 0.015 to 0.090 and particularly preferably 0.020 to 0.080.

3. Degradation Agent

The persulfate and the coated iron salt coated as described above can be combined to be used as a degradation agent for a viscous fluid that is used in a hydraulic fracturing method. One embodiment of the present invention provides a method for producing a degradation agent for a viscous fluid used in a hydraulic fracturing method, the method comprising the steps of: coating a persulfate to obtain a coated persulfate; coating an iron salt to obtain a coated iron salt; and mixing the coated persulfate and the coated iron salt. Thus, according to a preferable embodiment of the invention, a persulfate and an iron salt are separately coated before they are combined for use. This is because it may be preferable to coat the persulfate and the iron salt under different conditions so that the ratio (Y/X) of the coating-film thickness of the iron salt (Y) to the coating-film thickness of the persulfate (X) can lie in the range of 0.35 to 1.0 as described above.

A degradation agent is produced by mixing the coated persulfate and the coated iron salt. The term "mixing" as used herein refers to a case where the coated persulfate and the coated iron salt are mixed in advance and then added to a viscous fluid, and also a case where the coated persulfate and the coated iron salt are separately added to a viscous fluid to achieve a mixed state for the first time in the viscous fluid. In the case where they are mixed before addition to the viscous fluid, the method of mixing is not particularly limited. In the case where they are separately added to the viscous fluid, the order of addition is not particularly limited. Another embodiment of the present invention provides a method for degrading a viscous fluid used in a hydraulic fracturing method, the method comprising a step of adding a coated persulfate and a coated iron salt as an activator of the persulfate to the viscous fluid.

The persulfate and the iron salt are used such that their mass ratio prior to coating (Mass of persulfate prior to coating: Mass of iron salt prior to coating) is preferably 200:1 to 1:1, more preferably 100:1 to 4:3 and particularly preferably 20:1 to 2:1. By using them within such a range, effects of the present invention such as reducing gel residue, rapidly reducing the viscosity and the like can be enhanced.

5. Viscous Fluid

Yet another embodiment of the present invention provides a viscous fluid used in a hydraulic fracturing method, the viscous fluid comprising a solvent, a gelling agent and a gel degradation agent. The gel degradation agent is as described above. The viscous fluid may further contain proppants. The solvent of the viscous fluid may be fresh water, saltwater, seawater or the like, preferably fresh water.

Any gelling agent may be used as long as it can be used in a hydraulic fracturing method, where examples thereof include hydratable high-molecular compounds such as polysaccharide, polyacrylamide, polyacrylamide copolymer and polyalkylene oxide. Examples of the polysaccharide include guar gum, locust bean gum, gum karaya, xanthan gum, hydroxyethyl guar, hydroxypropyl guar, carboxymethylhydroxy guar, carboxymethyl guar, carboxyethyl cellulose, carboxymethyl cellulose and carboxymethylhydroxyethyl cellulose. One or more of them may be used alone or in combination.

The viscous fluid may further contain an additive that is generally employed in the field to which the present invention pertains, where examples thereof include a crosslinking agent, a surfactant, a pH adjuster, an anti-swelling agent, an iron content regulator, a friction modifier, a biocide, an anti-scaling agent and an anti-corrosive agent. Specific examples of the crosslinking agent include polyvalent metal ions such as borates, chromium(III), aluminum(III), titanium (IV) and zirconium(IV). Specific examples of the surfactant include isopropanol and ethylene glycol monobutyl ether. Specific examples of the pH adjuster include sodium hydroxide, potassium hydroxide, sodium carbonate and potassium carbonate. Specific examples of the anti-swelling agent include sodium chloride, potassium chloride and calcium chloride. Specific examples of the iron content regulator include citric acid. Specific examples of the friction modifier include polyacrylamide and glycerin. Specific examples of the biocide include glutaraldehyde, ammonium chloride and methanol. Specific examples of the anti-scaling agent include ethylene glycol. Specific examples of the anti-corrosive agent include N,N-dimethylformaldehyde. The viscous fluid can readily be prepared by mixing materials such as those described above.

EXAMPLES

Hereinafter, the present invention will be described in more detail by way of examples, although the content of the present invention should not be limited to these examples.
<Measurements>
(1) Median Size In the following Examples and Comparative Examples, the median size was measured as follows.

The particles were sorted using sieves with mesh sizes of 355 µm, 425 µm, 600 µm, 850 µm, 1,000 µm and 1,180 µm. For each sieve, the mass percentage of the particles that passed through the sieve was determined to calculate the weight-based median size ($D_{50}$) according to the following equation.

$$Z=\log X+(\log X-\log Y)\times(50-N(X))/(N(Y)-N(X))$$
$$D_{50}=10^Z$$

$D_{50}$: Weight-based median size
X: Maximum sieve size (µm) where the ratio of all particles that passed through the sieve was 50% or less
Y: Minimum sieve size (µm) where the ratio of all particles that passed through the sieve was 50% or more
N(X): Cumulative distribution (%) when X
N(Y): Cumulative distribution (%) when Y
(2) Coating-Film Thickness Five particles with sizes of 600 to 850 µm obtained by sorting the coated material with sieves were cut with a cutter knife and washed with water. After removing the core material inside (parts other than the coating film), the resultant was dried for an hour in a vacuum drier. The resulting coating film was observed with a SEM (Keyence VE-9800). The film thickness was measured based on an image captured at magnification of 200×. Ten parts were measured per particle and the average thickness of 50 parts was assumed as the coating-film thickness.

Example 1

(1) Preparation of Coating Solution (a)

1,411 g of distilled water was added to 589 g of polyvinylidene chloride latex, i.e., Saran PVDC latex (available from Asahi Kasei Corporation, Grade L820A), and stirred to prepare Coating solution (a) used for coating persulfate and iron salt particles. The concentration of the solid resin content in Coating solution (a) was adjusted to 15 wt %.

(2) Preparation of Coated Ammonium Persulfate Particles

Ammonium persulfate (available from Mitsubishi Gas Chemical Company, Inc.) was sorted with sieves having mesh sizes of 425 to 1,180 µm (available from Tokyo Screen Co., Ltd.) to use particles having sizes of 425 to 1,000 µm. The weight-based median size of the resulting particles was 568 µm as measured by a sieving method.

1,000 g of the resulting ammonium persulfate was fed into a fluidized bed system (FLOW COATER available from Freund Corporation) to cause them to behave as a fluid, onto which Coating solution (a) prepared above was sprayed. Coating was performed for 88 minutes under the following conditions: a supply air temperature of 70 to 80° C., a discharge air temperature of 30 to 40° C. and a spray velocity of 15 g/min. The final mass ratio of ammonium persulfate and the solid resin content in Coating solution (a) was adjusted to 5:1. The weight-based median size of the resulting coated particles was 596 µm as measured by a sieving method. In addition, the coating-film thickness was 33 µm.

(3) Preparation of Coated Ferrous Sulfate Heptahydrate Particles

Ferrous sulfate heptahydrate (available from FUJIFILM Wako Pure Chemical Corporation) was sorted with sieves having mesh sizes of 425 to 1,180 µm (available from Tokyo Screen Co., Ltd.) to use particles with sizes of 425 to 1,000 µm. The resulting particles had a weight-based median size of 408 µm as measured by a sieving method.

1,000 g of the resulting ferrous sulfate heptahydrate was fed into a fluidized bed system (FLOW COATER available from Freund Corporation) to cause them to behave as a fluid, onto which Coating solution (a) prepared above was sprayed. Coating was performed for 88 minutes under the following conditions: a supply air temperature of 70 to 80° C., a discharge air temperature of 30 to 40° C. and a spray velocity of 15 g/min. The final mass ratio of ferrous sulfate heptahydrate and the solid resin content in Coating solution (a) was adjusted to 5:1. The weight-based median size of the resulting coated particles was 490 µm as measured by a sieving method. In addition, the coating-film thickness was 31 µm.

Example 2

Coated ferrous sulfate heptahydrate particles were prepared in the same manner as Example 1 except that Coating solution (a) was applied for 71 minutes at a spray velocity of 15 g/min. The final mass ratio of ferrous sulfate heptahydrate and the solid resin content in Coating solution (a) was adjusted to 25:4. The weight-based median size of the resulting coated particles was 476 µm as measured by a sieving method. In addition, the coating-film thickness was 17 µm.

The same coated ammonium persulfate particles as those used in Example 1 were used.

Example 3

Coated ferrous sulfate heptahydrate particles were prepared in the same manner as Example 1 except that Coating solution (a) was applied for 53 minutes at a spray velocity of 15 g/min. The final mass ratio of ferrous sulfate heptahydrate and the solid resin content in Coating solution (a) was adjusted to 25:3. The weight-based median size of the resulting coated particles was 461 µm as measured by a sieving method. In addition, the coating-film thickness was 12 µm.

The same coated ammonium persulfate particles as those used in Example 1 were used.

Comparative Example 1

The coated ammonium persulfate particles prepared in Example 1 were used in the absence of the coated ferrous sulfate heptahydrate particles.

Comparative Example 2

Coated ferrous sulfate heptahydrate particles were prepared in the same manner as Example 1 except that Coating solution (a) was applied for 107 minutes at a spray velocity of 15 g/min. The final mass ratio of ferrous sulfate heptahydrate and the solid resin content in Coating solution (a) was adjusted to 25:6. The weight-based median size of the resulting coated particles was 496 μm as measured by a sieving method. In addition, the coating-film thickness was 39 μm.

The same coated ammonium persulfate particles as those used in Example 1 were used.

Comparative Example 3

Coated ferrous sulfate heptahydrate particles were prepared in the same manner as Example 1 except that Coating solution (a) was applied for 35 minutes at a spray velocity of 15 g/min. The final mass ratio of ferrous sulfate heptahydrate and the solid resin content in Coating solution (a) was adjusted to 25:2. The weight-based median size of the resulting coated particles was 423 μm as measured by a sieving method. In addition, the coating-film thickness was 10 μm.

The same coated ammonium persulfate particles as those used in Example 1 were used.

Comparative Example 4

The ammonium persulfate particles in Example 1 were used without coating in the absence of ferrous sulfate heptahydrate.

Comparative Example 5

Both of ammonium persulfate particles and ferrous sulfate heptahydrate in Example 1 were used without coating.

Test Example 1

Measurement of Gel Residue Rate

The coated ammonium persulfate particles and the coated ferrous sulfate heptahydrate particles prepared in each of the upper and lower layers while appropriately halting stirring, thereby obtaining a gel used for the test.

(2) Degradation of Gel 500 g of the gel prepared above was collected in a 1,000-mL beaker. The coated ammonium persulfate particles and the coated ferrous sulfate heptahydrate particles (gel degradation agents) prepared in each of the Examples and the Comparative Examples were added to the gel in amounts indicated in Table 1 (indicated as an amount of the coated particles). A watch glass was placed on the beaker, which was left to stand in a thermostatic bath at 50° C. Three hours after the addition of the gel degradation agent, the beaker was taken out from the thermostatic bath.

(3) Calculation of Gel Residue Rate

A nylon mesh (250 μm) was placed on a bottom surface of a Kiriyama funnel (inner diameter: 55 mm), onto which slurry containing 80 g of sea sand (available from FUJIFILM Wako Pure Chemical Corporation, particle size: 425 to 850 μm) and 200 g of water were added. Into this, the degraded gel taken out from the thermostatic bath was poured, and the resultant was subjected to vacuum filtration for 5 minutes using a vacuum pump. The gel residue rate was calculated according to the following equation.

Gel residue rate (%)={(Weight of Kiriyama funnel (g) after filtration)−(Weight of Kiriyama funnel (g) before addition of degraded gel)/(Amount of gel used:500 g)}×100

The results obtained are shown in Table 1 below.

TABLE 1

|  | Coating-film thickness of ammonium persulfate (X) (μm) | Coating-film thickness of ferrous sulfate heptahydrate (Y) (μm) | Ratio of coating-film thicknesses (Y)/(X) | Amount of ammonium persulfate added (g) | Amount of ferrous sulfate heptahydrate added (g) | Gel residue rate (%) |
|---|---|---|---|---|---|---|
| Example 1 | 33 | 31 | 0.9 | 2.5 | 1.25 | 2.6 |
| Example 2 | 33 | 17 | 0.5 | 2.5 | 1.20 | 1.5 |
| Example 3 | 33 | 12 | 0.4 | 2.5 | 1.15 | 1.4 |
| Comparative Example 1 | 33 | — | — | 2.5 | 0 | 3.2 |
| Comparative Example 2 | 33 | 39 | 1.2 | 2.5 | 1.30 | 3.0 |
| Comparative Example 3 | 33 | 10 | 0.3 | 2.5 | 1.1 | 1.8 |
| Comparative Example 4 | — | — | — | 2.1 | 0 | 3.5 |
| Comparative Example 5 | — | — | — | 2.1 | 1.05 | 1.5 |

Examples 1-3 and Comparative Examples 1-5 were added to a gel to degrade the gel and compare the gel residue rates. Specifically, the process was as follows.

(1) Preparation of Gel 850 g of water and 3.2 g of guar gum (available from FUJIFILM Wako Pure Chemical Corporation) were placed into a 2,000-mL beaker and stirred for 2 hours with a stirring blade at 400 rpm. Subsequently, an aqueous solution obtained by dissolving 1.2 g of sodium tetraborate decahydrate (available from FUJIFILM Wako Pure Chemical Corporation) in 150 g of water was added speedily. The resultant was stirred for an hour at a stirring rate of 200 rpm to mix Test Example 2

Measurement of Gel Viscosity 100 g of the gel prepared in Test Example 1 was taken into a 250-mL beaker. The coated ammonium persulfate particles and the coated ferrous sulfate heptahydrate particles (gel degradation agents) prepared in each of the Examples and the Comparative Examples were added to the gel in amounts indicated in Table 2 (indicated as an amount of the coated particles). A watch glass was placed on the beaker, which was left to stand in a thermostatic bath at 50° C. The gel viscosity was measured during a predetermined time after the addition of the gel degradation agent.

TABLE 2

| | Added amount (g) | |
|---|---|---|
| | Ammonium persulfate | Ferrous sulfate heptahydrate |
| Example 1 | 0.5 | 0.25 |
| Example 2 | 0.5 | 0.24 |
| Example 3 | 0.5 | 0.23 |
| Comparative Example 1 | 0.5 | — |
| Comparative Example 2 | 0.5 | 0.26 |
| Comparative Example 3 | 0.5 | 0.22 |
| Comparative Example 4 | 0.42 | — |
| Comparative Example 5 | 0.42 | 0.21 |

Viscosity was measured using RVDV-II+Pro and Cone Plate Spindle CPE-52 available from Brookfield. 1 mL of gel taken during a predetermined time (every 30 minutes) following addition of the gel degradation agent was placed on a sample support, which was mounted on the viscometer and left to stand still for 2 minutes. Thereafter, the spindle was rotated at 12 rpm (shear rate: 24 s$^{-1}$) to read the measure at the time point of 60 seconds.

In addition, the viscosity-reducing rate during specific one hour of the entire measurement time that gave maximum viscosity reduction was calculated according to the following equation.

Viscosity-reducing rate (%)={(Viscosity after $x$ hours)−(Viscosity after($x$+1)hours)/Viscosity prior to addition of gel degradation agent}×100

Figure 1:
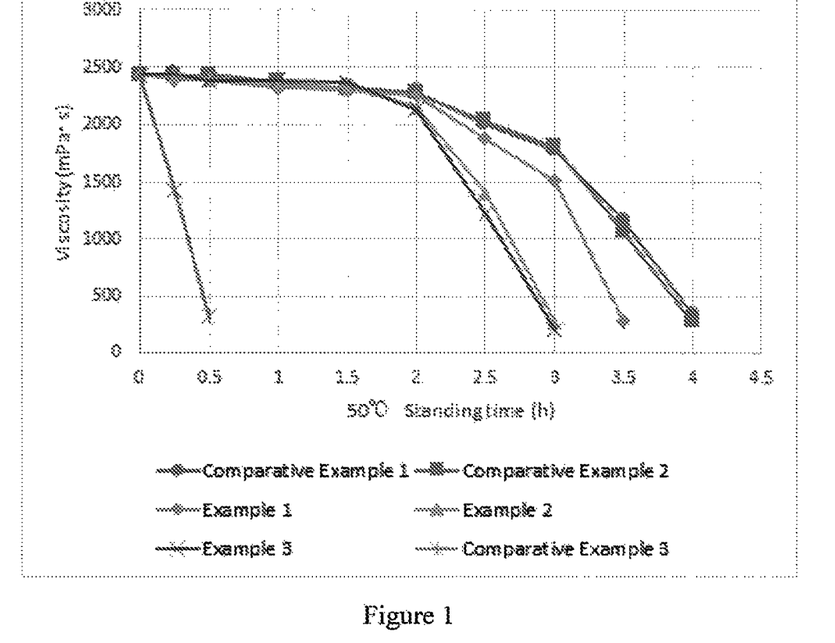
FIG. 1 A diagram showing results from measurements of gel viscosity in Examples 1-3 and Comparative Examples 1-5.

The viscosity-reducing rates were calculated between Hour 2.5 to 3.5 following addition of the gel degradation agent for Example 1, between Hour 2 to 3 following addition of the gel degradation agents for Examples 2 and 3, and between Hour 3 to 4 hours following addition of the gel degradation agents for Comparative Examples 1 and 2. The results are shown in Table 3 below and FIG. 1.

ticles. The concentration of the solid resin content in Coating solution (b) was adjusted to 15 wt %.

(2) Preparation of Coated Ammonium Persulfate Particles

Ammonium persulfate (available from Mitsubishi Gas Chemical Company, Inc.) was sorted with sieves having mesh sizes of 425 to 1,180 μm (available from Tokyo Screen Co., Ltd.) to use particles having sizes of 425 to 1,000 μm. The weight-based median size of the resulting particles was 568 μm as measured by a sieving method.

1,000 g of the resulting ammonium persulfate was fed into a fluidized bed system (FLOW COATER available from Freund Corporation) to cause them to behave as a fluid, onto which Coating solution (b) prepared above was sprayed. Coating was performed for 133 minutes under the following conditions: a supply air temperature of 50 to 60° C., a discharge air temperature of 30 to 40° C. and a spray velocity of 10 g/min. The final mass ratio of ammonium persulfate and the solid resin content in Coating solution (b) was adjusted to 5:1. The weight-based median size of the resulting coated particles was 585 μm as measured by a sieving method. In addition, the coating-film thickness was 32 μm.

(3) Preparation of Coated Ferrous Sulfate Heptahydrate Particles

Ferrous sulfate heptahydrate (available from FUJIFILM Wako Pure Chemical Corporation) was sorted with sieves having mesh sizes of 425 to 1,180 μm (available from Tokyo Screen Co., Ltd.) to use particles with sizes of 425 to 1,000 μm. The resulting particles had a weight-based median size of 408 μm as measured by a sieving method.

1,000 g of the resulting ferrous sulfate heptahydrate was fed into a fluidized bed system (FLOW COATER available from Freund Corporation) to cause them to behave as a fluid, onto which Coating solution (b) prepared above was sprayed. Coating was performed for 167 minutes under the following conditions: a supply air temperature of 50 to 60° C., a discharge air temperature of 30 to 40° C. and a spray velocity of 8 g/min. The final mass ratio of ferrous sulfate heptahydrate and the solid resin content in Coating solution (b) was adjusted to 5:1. The weight-based median size of the

TABLE 3

| | Viscosity (mPa · s) | | | | | | | | | | Viscosity-reducing rate (%) between |
|---|---|---|---|---|---|---|---|---|---|---|---|
| | 0 hour later | 0.25 hours later | 0.5 hours later | 1 hour later | 1.5 hours later | 2 hours later | 2.5 hours later | 3 hours later | 3.5 hours later | 4 hours later | Hour x to (x + 1) |
| Example 1 | 2439 | 2398 | 2388 | 2328 | 2308 | 2254 | 1878 | 1511 | 288 | — | 65.2 |
| Example 2 | 2439 | 2436 | 2398 | 2347 | 2334 | 2158 | 1404 | 268 | — | — | 77.5 |
| Example 3 | 2439 | 2444 | 2389 | 2387 | 2368 | 2133 | 1222 | 208 | — | — | 78.9 |
| Comparative Example 1 | 2439 | 2444 | 2408 | 2348 | 2333 | 2288 | 2008 | 1777 | 1167 | 345 | 58.7 |
| Comparative Example 2 | 2439 | 2415 | 2442 | 2377 | 2314 | 2278 | 2034 | 1809 | 1068 | 277 | 62.8 |
| Comparative Example 3 | 2439 | 1436 | 322 | — | — | — | — | — | — | — | — |
| Comparative Example 4 | 2439 | 16.3 | — | — | — | — | — | — | — | — | — |
| Comparative Example 5 | 2439 | 21.5 | — | — | — | — | — | — | — | — | — |

Example 4

(1) Preparation of Coating Solution (b)

1,398 g of distilled water was added to 602 g of aqueous acrylic resin VONCOAT EC-905EF (available from DIC Corporation) and the mixture was stirred to prepare Coating solution (b) used for coating persulfate and iron salt parresulting coated particles was 451 μm as measured by a sieving method. In addition, the coating-film thickness was 30 μm.

Example 5

Coated ferrous sulfate heptahydrate particles were prepared in the same manner as Example 4 except that Coating solution (b) was applied for 100 minutes under the following conditions: a supply air temperature of 50 to 60° C., a discharge air temperature of 30 to 40° C. and a spray velocity of 8 g/min. The final mass ratio of ferrous sulfate heptahydrate and the solid resin content in Coating solution (b) was adjusted to 25:3. The weight-based median size of the resulting coated particles was 443 μm as measured by a sieving method. In addition, the coating-film thickness was 14 μm.

The same coated ammonium persulfate particles as those used in Example 4 were used.

Comparative Example 6

The coated ammonium persulfate particles prepared in Example 4 were used in the absence of the coated ferrous sulfate heptahydrate particles.

Comparative Example 7

Coated ferrous sulfate heptahydrate particles were prepared in the same manner as Example 4 except that Coating solution (b) was applied for 67 minutes under the following conditions: a supply air temperature of 50 to 60° C., a discharge air temperature of 30 to 40° C. and a spray velocity of 8 g/min. The final mass ratio of ferrous sulfate heptahydrate and the solid resin content in Coating solution (b) was adjusted to 25:2. The weight-based median size of the resulting coated particles was 422 μm as measured by a sieving method. In addition, the coating-film thickness was 10 μm.

The same coated ammonium persulfate particles as those used in Example 4 were used.

Comparative Example 8

Coated ferrous sulfate heptahydrate particles were prepared in the same manner as Example 4 except that Coating solution (b) was applied for 200 minutes under the following conditions: a supply air temperature of 50 to 60° C., a discharge air temperature of 30 to 40° C. and a spray velocity of 8 g/min. The final mass ratio of ferrous sulfate heptahydrate and the solid resin content in Coating solution (b) was adjusted to 25:6. The weight-based median size of the resulting coated particles was 466 μm as measured by a sieving method. In addition, the coating-film thickness was 37 μm.

The same coated ammonium persulfate particles as those used in Example 4 were used.

Test Example 3

Measurement of Gel Residue Rate

The coated ammonium persulfate particles and the coated ferrous sulfate heptahydrate particles prepared in each of Examples 4 and 5 and Comparative Examples 6-8 were added to a gel to degrade the gel and compare the gel residue rates. Specifically, the process was as follows.

(1) Preparation of Gel

The same gel as that in Test Example 1 was used.

(2) Degradation of Gel

The gel was degraded by the same process as Test Example 1. The amounts of the coated ammonium persulfate particles and the coated ferrous sulfate heptahydrate particles added were as indicated in Table 4 (indicated as an amount of the coated particles).

(3) Calculation of Gel Residue Rate

The gel residue rate was calculated in the same manner as Test Example 1. The results are shown in Table 4 below.

TABLE 4

| | Coating-film thickness of ammonium persulfate (X) (μm) | Coating-film thickness of ferrous sulfate heptahydrate (Y) (μm) | Ratio of coating-film thicknesses (Y)/(X) | Amount of ammonium persulfate added (g) | Amount of ferrous sulfate heptahydrate added (g) | Gel residue rate (%) |
|---|---|---|---|---|---|---|
| Example 4 | 32 | 30 | 0.9 | 2.5 | 1.25 | 2.6 |
| Example 5 | 32 | 14 | 0.4 | 2.5 | 1.15 | 1.6 |
| Comparative Example 6 | 32 | — | — | 2.5 | 0 | 3.3 |
| Comparative Example 7 | 32 | 10 | 0.3 | 2.5 | 1.1 | 1.6 |
| Comparative Example 8 | 32 | 37 | 1.2 | 2.5 | 1.3 | 3.1 |

Test Example 4

Measurement of Gel Viscosity

The gel viscosity was measured in the same manner as Test Example 2. The amounts of the coated ammonium persulfate particles and the coated ferrous sulfate heptahydrate particles added were as shown in Table 5 (indicated as an amount of the coated particles).

TABLE 5

| | Added amount (g) | |
|---|---|---|
| | Ammonium persulfate | Ferrous sulfate heptahydrate |
| Example 4 | 0.5 | 0.25 |
| Example 5 | 0.5 | 0.23 |
| Comparative Example 6 | 0.5 | — |
| Comparative Example 7 | 0.5 | 0.22 |
| Comparative Example 8 | 0.5 | 0.26 |

Figure 2:
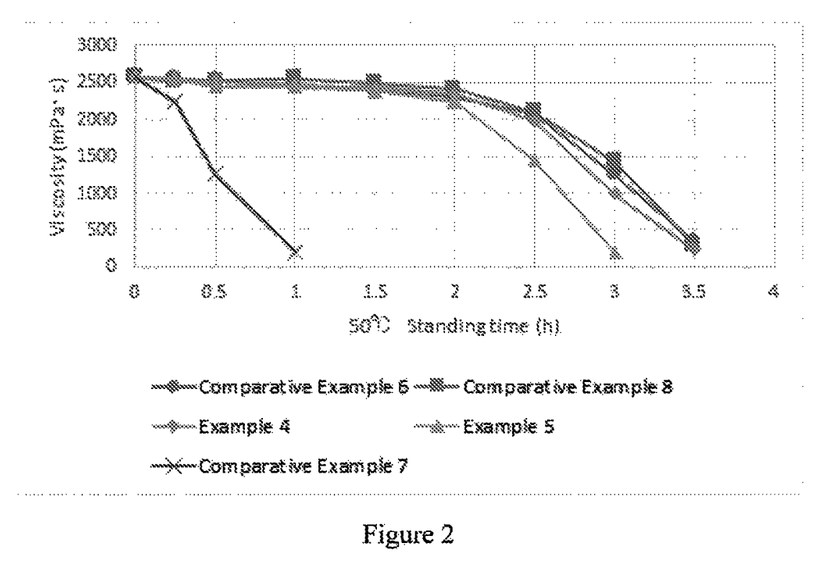
FIG. 2 A diagram showing results from measurements of gel viscosity in Examples 4 and 5 and Comparative Examples 6-8.

The viscosity-reducing rates were calculated between Hour 2 to 3 following addition of the gel degradation agents for Examples 4 and 5, and between Hour 2.5 to 3.5 following addition of the gel degradation agents for Comparative Examples 6 and 8. The results are shown in Table 6 below and FIG. 2.

TABLE 6

| | Viscosity (mPa·s) | | | | | | | | | Viscosity-reducing rate (%) between |
|---|---|---|---|---|---|---|---|---|---|---|
| | 0 hour later | 0.25 hours later | 0.5 hours later | 1 hour later | 1.5 hours later | 2 hours later | 2.5 hours later | 3 hours later | 3.5 hours later | Hour x to (x + 1) |
| Example 4 | 2580 | 2538 | 2468 | 2442 | 2405 | 2348 | 1694 | 637 | 198 | 66.3 |
| Example 5 | 2580 | 2556 | 2445 | 2438 | 2389 | 2244 | 1452 | 200 | — | 79.2 |
| Comparative Example 6 | 2580 | 2510 | 2458 | 2468 | 2367 | 2311 | 1887 | 1256 | 389 | 58.1 |
| Comparative Example 7 | 2580 | 2238 | 1256 | 200 | — | — | — | — | — | — |
| Comparative Example 8 | 2580 | 2555 | 2488 | 2490 | 2368 | 2234 | 1868 | 1136 | 345 | 59.0 |

Example I-1

(1) Preparation of Coating Solution (a)

The same Coating solution (a) as that prepared in Example 1 was used.

(2) Preparation of Coated Potassium Persulfate Particles

Potassium persulfate (available from Mitsubishi Gas Chemical Company, Inc.) was sorted with sieves having mesh sizes of 425 to 1,180 μm (available from Tokyo Screen Co., Ltd.) to use particles having sizes of 425 to 1,000 μm. The weight-based median size of the resulting particles was 421 μm as measured by a sieving method.

1,000 g of the resulting potassium persulfate was fed into a fluidized bed system (FLOW COATER available from Freund Corporation) to cause them to behave as a fluid, onto which Coating solution (a) prepared above was sprayed. Coating was performed for 88 minutes under the following conditions: a supply air temperature of 70 to 80° C., a discharge air temperature of 30 to 40° C. and a spray velocity of 15 g/min. The final mass ratio of potassium persulfate and the solid resin content in Coating solution (a) was adjusted to 5:1. The weight-based median size of the resulting coated particles was 494 μm as measured by a sieving method. In addition, the coating-film thickness was 30 μm.

(3) Preparation of Coated Ferrous Sulfate Heptahydrate Particles

The same ferrous sulfate heptahydrate as that in Example 1 (available from FUJIFILM Wako Pure Chemical Corporation, weight-based median size of 408 μm as measured by a sieving method) was used to prepare coated ferrous sulfate heptahydrate particles in the same manner as Example 1. The final mass ratio of ferrous sulfate heptahydrate and the solid resin content in Coating solution (a) was adjusted to 5:1. The weight-based median size of the resulting coated particles was 490 μm as measured by a sieving method. In addition, the coating-film thickness was 31 μm.

Example I-2

Coated ferrous sulfate heptahydrate particles were prepared in the same manner as Example I-1 except that Coating solution (a) was applied for 71 minutes at a spray velocity of 15 g/min. The final mass ratio of ferrous sulfate heptahydrate and the solid resin content in Coating solution (a) was adjusted to 25:4. The weight-based median size of the resulting coated particles was 476 μm as measured by a sieving method. In addition, the coating-film thickness was 17 μm.

The same coated potassium persulfate particles as those in Example I-1 were used.

Example I-3

Coated ferrous sulfate heptahydrate particles were prepared in the same manner as Example I-1 except that Coating solution (a) was applied for 53 minutes at a spray velocity of 15 g/min. The final mass ratio of ferrous sulfate heptahydrate and the solid resin content in Coating solution (a) was adjusted to 25:3. The weight-based median size of the resulting coated particles was 461 μm as measured by a sieving method. In addition, the coating-film thickness was 12 μm.

The same coated potassium persulfate particles as those in Example I-1 were used.

Comparative Example I-1

The coated potassium persulfate particles prepared in Example I-1 were used in the absence of the coated ferrous sulfate heptahydrate particles.

Comparative Example I-2

Coated ferrous sulfate heptahydrate particles were prepared in the same manner as Example I-1 except that Coating solution (a) was applied for 107 minutes at a spray velocity of 15 g/min. The final mass ratio of ferrous sulfate heptahydrate and the solid resin content in Coating solution (a) was adjusted to 25:6. The weight-based median size of the resulting coated particles was 496 μm as measured by a sieving method. In addition, the coating-film thickness was 39 μm.

The same coated potassium persulfate particles as those in Example I-1 were used.

Comparative Example I-3

Coated ferrous sulfate heptahydrate particles were prepared in the same manner as Example I-1 except that Coating solution (a) was applied for 35 minutes at a spray velocity of 15 g/min. The final mass ratio of ferrous sulfate heptahydrate and the solid resin content in Coating solution (a) was adjusted to 25:2. The weight-based median size of the resulting coated particles was 423 μm as measured by a sieving method. In addition, the coating-film thickness was 10 μm.

The same coated potassium persulfate particles as those in Example I-1 were used.

Test Example I-1

Measurement of Gel Residue Rate

The coated potassium persulfate particles and the coated ferrous sulfate heptahydrate particles prepared in each of Examples I-1 to I-3 and Comparative Examples I-1 and I-2 were added to a gel to degrade the gel and compare the gel residue rates. Specifically, the process was as follows.

(1) Preparation of Gel

The same gel as that in Test Example 1 was used.

(2) Degradation of Gel

The gel was degraded by the same process as Test Example 1. The amounts of the coated potassium persulfate particles and the coated ferrous sulfate heptahydrate particles added were as indicated in Table 7 (indicated as an amount of the coated particles).

(3) Calculation of Gel Residue Rate

The gel residue rate was calculated in the same manner as Test Example 1. The results are shown in Table 7 below.

TABLE 7

|  | Coating-film thickness of potassium persulfate (X) (μm) | Coating-film thickness of ferrous sulfate heptahydrate (Y) (μm) | Ratio of coating-film thicknesses (Y)/(X) | Amount of potassium persulfate added (g) | Amount of ferrous sulfate heptahydrate added (g) | Gel residue rate (%) |
|---|---|---|---|---|---|---|
| Example I-1 | 30 | 31 | 1.03 | 3.0 | 1.30 | 3.0 |
| Example I-2 | 30 | 17 | 0.57 | 3.0 | 1.25 | 1.5 |
| Example I-3 | 30 | 12 | 0.40 | 3.0 | 1.20 | 1.4 |
| Comparative Example I-1 | 30 | — | — | 3.0 | — | 11.2 |
| Comparative Example I-2 | 30 | 39 | 1.30 | 3.0 | 1.30 | 9.8 |
| Comparative Example I-3 | 30 | 10 | 0.33 | 3.0 | 1.10 | — |

Test Example I-2

Measurement of Gel Viscosity

The gel viscosity was measured in the same manner as Test Example 2. The amounts of the coated potassium persulfate particles and the coated ferrous sulfate heptahydrate particles added were as shown in Table 8 (indicated as an amount of the coated particles).

TABLE 8

|  | Added amount (g) | |
|---|---|---|
|  | Potassium persulfate | Ferrous sulfate heptahydrate |
| Example I-1 | 0.6 | 0.25 |
| Example I-2 | 0.6 | 0.24 |
| Example I-3 | 0.6 | 0.23 |
| Comparative Example I-1 | 0.6 | — |
| Comparative Example I-2 | 0.6 | 0.26 |
| Comparative Example I-3 | 0.6 | 0.22 |

The viscosity-reducing rates were calculated between Hour 2.5 to 3.5 following addition of the gel degradation agent for Example I-1, between Hour 2 to 3 following addition of the gel degradation agents for Examples I-2 and I-3, and between Hour 3.5 to 4.5 following addition of the gel degradation agents for Comparative Examples I-1 and I-2. The results are shown in Table 9 below.

TABLE 9

|  | Viscosity (mPa · s) | | | | | | | | | | | Viscosity-reducing rate (%) between |
|---|---|---|---|---|---|---|---|---|---|---|---|---|
|  | 0 hour later | 0.25 hours later | 0.5 hours later | 1 hour later | 1.5 hours later | 2 hours later | 2.5 hours later | 3 hours later | 3.5 hours later | 4 hours later | 4.5 hours later | Hour x to (x + 1) |
| Example I-1 | 2625 | 2633 | 2555 | 2545 | 2342 | 2288 | 1920 | 1413 | 244 | — | — | 63.8 |
| Example I-2 | 2625 | 2511 | 2608 | 2567 | 2408 | 2249 | 1529 | 211 | — | — | — | 77.6 |

TABLE 9-continued

| | Viscosity (mPa · s) | | | | | | | | | | | Viscosity-reducing rate (%) between |
|---|---|---|---|---|---|---|---|---|---|---|---|---|
| | 0 hour later | 0.25 hours later | 0.5 hours later | 1 hour later | 1.5 hours later | 2 hours later | 2.5 hours later | 3 hours later | 3.5 hours later | 4 hours later | 4.5 hours later | Hour x to (x + 1) |
| Example I-3 | 2625 | 2612 | 2592 | 2612 | 2463 | 2133 | 1222 | 255 | — | — | — | 71.5 |
| Comparative Example I-1 | 2625 | 2730 | 2633 | 2540 | 2315 | 2266 | 2088 | 1777 | 1390 | 945 | 341 | 40.0 |
| Comparative Example I-2 | 2625 | 2588 | 2565 | 2512 | 2443 | 2308 | 2105 | 1812 | 1444 | 1000 | 267 | 44.8 |
| Comparative Example I-3 | 2625 | 1626 | 412 | — | — | — | — | — | — | — | — | — |

Example II-1

(1) Preparation of Coating Solution (a)

The same Coating solution (a) as that in Example 1 was used.

(2) Preparation of Coated Sodium Persulfate Particles

Sodium persulfate (available from Mitsubishi Gas Chemical Company, Inc.) was sorted with sieves having mesh sizes of 425 to 1,180 μm (available from Tokyo Screen Co., Ltd.) to use particles having sizes of 425 to 1,000 μm. The weight-based median size of the resulting particles was 416 μm as measured by a sieving method.

1,000 g of the resulting sodium persulfate was fed into a fluidized bed system (FLOW COATER available from Freund Corporation) to cause them to behave as a fluid, onto which Coating solution (a) prepared above was sprayed. Coating was performed for 88 minutes under the following conditions: a supply air temperature of 70 to 80° C., a discharge air temperature of 30 to 40° C. and a spray velocity of 15 g/min. The final mass ratio of sodium persulfate and the solid resin content in Coating solution (a) was adjusted to 5:1. The weight-based median size of the resulting coated particles was 482 μm as measured by a sieving method. In addition, the coating-film thickness was 31 μm.

(3) Preparation of Coated Ferrous Sulfate Heptahydrate Particles

The same ferrous sulfate heptahydrate as that in Example 1 (available from FUJIFILM Wako Pure Chemical Corporation, weight-based median size of 408 μm as measured by a sieving method) was used to prepare coated ferrous sulfate heptahydrate particles in the same manner as Example 1. The final mass ratio of ferrous sulfate heptahydrate and the solid resin content in Coating solution (a) was adjusted to 5:1. The weight-based median size of the resulting coated particles was 490 μm as measured by a sieving method. In addition, the coating-film thickness was 31 μm.

Example II-2

Coated ferrous sulfate heptahydrate particles were prepared in the same manner as Example II-1 except that Coating solution (a) was applied for 71 minutes at a spray velocity of 15 g/min. The final mass ratio of ferrous sulfate heptahydrate and the solid resin content in Coating solution (a) was adjusted to 25:4. The weight-based median size of the resulting coated particles was 476 μm as measured by a sieving method. In addition, the coating-film thickness was 17 μm.

The same coated sodium persulfate particles as those in Example II-1 were used.

Example II-3

Coated ferrous sulfate heptahydrate particles were prepared in the same manner as Example II-1 except that Coating solution (a) was applied for 53 minutes at a spray velocity of 15 g/min. The final mass ratio of ferrous sulfate heptahydrate and the solid resin content in Coating solution (a) was adjusted to 25:3. The weight-based median size of the resulting coated particles was 461 μm as measured by a sieving method. In addition, the coating-film thickness was 12 μm.

The same coated sodium persulfate particles as those in Example II-1 were used.

Comparative Example II-1

The coated sodium persulfate particles prepared in Example II-1 were used in the absence of the coated ferrous sulfate heptahydrate particles.

Comparative Example II-2

Coated ferrous sulfate heptahydrate particles were prepared in the same manner as Example II-1 except that Coating solution (a) was applied for 107 minutes at a spray velocity of 15 g/min. The final mass ratio of ferrous sulfate heptahydrate and the solid resin content in Coating solution (a) was adjusted to 25:6. The weight-based median size of the resulting coated particles was 496 μm as measured by a sieving method. In addition, the coating-film thickness was 39 μm.

The same coated sodium persulfate particles as those in Example II-1 were used.

Comparative Example II-3

Coated ferrous sulfate heptahydrate particles were prepared in the same manner as Example II-1 except that Coating solution (a) was applied for 35 minutes at a spray velocity of 15 g/min. The final mass ratio of ferrous sulfate heptahydrate and the solid resin content in Coating solution (a) was adjusted to 25:2. The weight-based median size of the resulting coated particles was 423 μm as measured by a sieving method. In addition, the coating-film thickness was 10 μm.

The same coated sodium persulfate particles as those in Example II-1 were used.

Test Example II-1

Measurement of Gel Residue Rate

The coated sodium persulfate particles and the coated ferrous sulfate heptahydrate particles prepared in each of Examples II-1 to II-3 and Comparative Examples II-1 and II-2 were added to a gel to degrade the gel and compare the gel residue rates. Specifically, the process was as follows.

(1) Preparation of Gel

The same gel as that in Test Example 1 was used.

(2) Degradation of Gel

The gel was degraded by the same process as Test Example 1. The amount of the coated sodium persulfate particles and the coated ferrous sulfate heptahydrate particles added were as indicated in Table 10 (indicated as an amount of the coated particles).

(3) Calculation of Gel Residue Rate

The gel residue rate was calculated in the same manner as Test Example 1. The results obtained are shown in Table 10 below.

TABLE 10

|  | Coating-film thickness of sodium persulfate (X) (μm) | Coating-film thickness of ferrous sulfate heptahydrate (Y) (μm) | Ratio of coating-film thicknesses (Y)/(X) | Amount of sodium persulfate added (g) | Amount of ferrous sulfate heptahydrate added (g) | Gel residue rate (%) |
| --- | --- | --- | --- | --- | --- | --- |
| Example II-1 | 31 | 31 | 1.00 | 2.6 | 1.25 | 2.8 |
| Example II-2 | 31 | 17 | 0.55 | 2.6 | 1.20 | 1.3 |
| Example II-3 | 31 | 12 | 0.39 | 2.6 | 1.15 | 1.2 |
| Comparative Example II-1 | 31 | — | — | 2.6 | — | 12.2 |
| Comparative Example II-2 | 31 | 39 | 1.26 | 2.6 | 1.30 | 11.4 |
| Comparative Example II-3 | 31 | 10 | 0.32 | 2.6 | 1.10 | 1.2 |

Test Example II-2

Measurement of Gel Viscosity

The gel viscosity was measured in the same manner as Test Example 2. The amounts of the coated sodium persulfate particles and the coated ferrous sulfate heptahydrate particles added were as shown in Table 11 (indicated as an amount of the coated particles).

TABLE 11

|  | Added amount (g) | |
| --- | --- | --- |
|  | Sodium persulfate | Ferrous sulfate heptahydrate |
| Example II-1 | 0.52 | 0.25 |
| Example II-2 | 0.52 | 0.24 |
| Example II-3 | 0.52 | 0.23 |
| Comparative Example II-1 | 0.52 | — |
| Comparative Example II-2 | 0.52 | 0.26 |
| Comparative Example II-3 | 0.52 | 0.22 |

The viscosity-reducing rates were calculated between Hour 3 to 4 following addition of the gel degradation agent for Example II-1, between Hour 2 to 3 following addition of the gel degradation agents for Examples II-2 and II-3, and between Hour 4 to 5 following addition of the gel degradation agents for Comparative Examples II-1 and II-2. The results are shown in Table 12 below.

TABLE 12

|  | Viscosity (mPa · s) | | | | | | | | | | | | Viscosity-reducing rate |
| --- | --- | --- | --- | --- | --- | --- | --- | --- | --- | --- | --- | --- | --- |
|  | 0 hour later | 0.25 hours later | 0.5 hours later | 1 hour later | 1.5 hours later | 2 hours later | 2.5 hours later | 3 hours later | 3.5 hours later | 4 hours later | 4.5 hours later | 5 hours later | (%) between Hour x to (x + 1) |
| Example II-1 | 2781 | 2920 | 2855 | 2842 | 2811 | 2765 | 2359 | 1844 | 1012 | 211 | — | — | 58.7 |
| Example II-2 | 2781 | 2811 | 2768 | 2755 | 2533 | 2422 | 1520 | 271 | — | — | — | — | 77.3 |
| Example II-3 | 2781 | 2943 | 2800 | 2788 | 2510 | 2366 | 1276 | 208 | — | — | — | — | 77.6 |
| Comparative Example II-1 | 2781 | 2888 | 2788 | 2811 | 2724 | 2511 | 2422 | 2058 | 1721 | 1237 | 956 | 388 | 30.5 |

TABLE 12-continued

| | Viscosity (mPa · s) | | | | | | | | | | | | Viscosity-reducing rate |
|---|---|---|---|---|---|---|---|---|---|---|---|---|---|
| | 0 hour later | 0.25 hours later | 0.5 hours later | 1 hour later | 1.5 hours later | 2 hours later | 2.5 hours later | 3 hours later | 3.5 hours later | 4 hours later | 4.5 hours later | 5 hours later | (%) between Hour x to (x + 1) |
| Comparative Example II-2 | 2781 | 2832 | 2840 | 2761 | 2745 | 2777 | 2516 | 2167 | 1814 | 1412 | 984 | 333 | 38.8 |
| Comparative Example II-3 | 2781 | 1444 | 211 | — | — | — | — | — | — | — | — | — | — |

Example III-1

(1) Preparation of Coating Solution (a)

The same coating solution (a) as that prepared in Example 1 was used.

(2) Preparation of Coated Ammonium Persulfate Particles

Coated ammonium persulfate particles were prepared in the same manner as Example 1 except that the same ammonium persulfate as that in Example 1 (available from Mitsubishi Gas Chemical Company, Inc., weight-based median size of 568 μm as measured by a sieving method) was used and Coating solution (a) was applied for 133 minutes under the following conditions: a supply air temperature of 50 to 60° C., a discharge air temperature of 30 to 40° C. and a spray velocity of 10 g/min. The final mass ratio of ammonium persulfate and the solid resin content in Coating solution (a) was adjusted to 5:1. The weight-based median size of the resulting coated particles was 585 μm as measured by a sieving method. In addition, the coating-film thickness was 33 μm.

(3) Preparation of Coated Ferric Sulfate N-Hydrate Particles

Ferric sulfate n-hydrate (available from FUJIFILM Wako Pure Chemical Corporation) was sorted with sieves having mesh sizes of 425 to 1,180 μm (available from Tokyo Screen Co., Ltd.) to use the particles having sizes of 425 to 1,000 μm. The weight-based median size of the resulting particles was 518 μm as measured by a sieving method.

1,000 g of the resulting ferric sulfate n-hydrate was fed into a fluidized bed system (FLOW COATER available from Freund Corporation) to cause them to behave as a fluid, onto which Coating solution (a) prepared above was sprayed. Coating was performed for 88 minutes under the following conditions: a supply air temperature of 70 to 80° C., a discharge air temperature of 30 to 40° C. and a spray velocity of 15 g/min. The final mass ratio of ferric sulfate and the solid resin content in Coating solution (a) was adjusted to 5:1. The weight-based median size of the resulting coated particles was 548 μm as measured by a sieving method. In addition, the coating-film thickness was 32 μm.

Example III-2

Coated ferric sulfate n-hydrate particles were prepared in the same manner as Example III-1 except that Coating solution (a) was applied for 71 minutes at a spray velocity of 15 g/min. The final mass ratio of ferric sulfate n-hydrate and the solid resin content in Coating solution (a) was adjusted to 25:4. The weight-based median size of the resulting coated particles was 535 μm as measured by a sieving method. In addition, the coating-film thickness was 15 μm.

The same coated ammonium persulfate particles as those in Example III-1 were used.

Comparative Example III-1

The coated ammonium persulfate particles prepared in Example III-1 were used in the absence of the coated ferric sulfate n-hydrate particles.

Comparative Example III-2

Coated ferric sulfate n-hydrate particles were prepared in the same manner as Example III-1 except that Coating solution (a) was applied for 107 minutes at a spray velocity of 15 g/min. The final mass ratio of ferric sulfate n-hydrate and the solid resin content in Coating solution (a) was adjusted to 25:6. The weight-based median size of the resulting coated particles was 571 μm as measured by a sieving method. In addition, the coating-film thickness was 38 μm.

The same coated ammonium persulfate particles as those in Example III-1 were used.

Comparative Example III-3

Coated ferric sulfate n-hydrate particles were prepared in the same manner as Example III-1 except that Coating solution (a) was applied for 35 minutes at a spray velocity of 15 g/min. The final mass ratio of ferric sulfate n-hydrate and the solid resin content in Coating solution (a) was adjusted to 25:2. The weight-based median size of the resulting coated particles was 423 μm as measured by a sieving method. In addition, the coating-film thickness was 10 μm.

The same coated ammonium persulfate particles as those in Example III-1 were used.

Test Example III-1

Measurement of Gel Residue Rate

The coated ammonium persulfate particles and the coated ferric sulfate n-hydrate particles prepared in each of Examples III-1 and III-2 and Comparative Examples III-1 and III-2 were added to a gel to degrade the gel and compare the gel residue rates. Specifically, the process was as follows.

(1) Preparation of Gel

The same gel as that in Test Example 1 was used.

(2) Degradation of Gel

The gel was degraded by the same process as Test Example 1. The amounts of the coated ammonium persulfate particles and the coated ferric sulfate n-hydrate particles added were as indicated in Table 13 (indicated as an amount of the coated particles).

(3) Calculation of Gel Residue Rate

The gel residue rate was calculated in the same manner as Test Example 1. The results obtained are shown in Table 13 below.

TABLE 13

|  | Coating-film thickness of ammonium persulfate (X) (μm) | Coating-film thickness of ferric sulfate n-hydrate (Y) (μm) | Ratio of coating-film thicknesses (Y)/(X) | Amount of ammonium persulfate added (g) | Amount of ferric sulfate n-hydrate added (g) | Gel residue rate (%) |
| --- | --- | --- | --- | --- | --- | --- |
| Example III-1 | 33 | 32 | 0.97 | 2.5 | 1.81 | 2.4 |
| Example III-2 | 33 | 15 | 0.45 | 2.5 | 1.69 | 1.2 |
| Comparative Example III-1 | 33 | — | — | 2.5 | — | 3.2 |
| Comparative Example III-2 | 33 | 38 | 1.15 | 2.5 | 1.87 | 3.1 |
| Comparative Example III-3 | 33 | 10 | 0.30 | 2.5 | 1.87 | 1.2 |

Test Example III-2

Measurement of Gel Viscosity

The gel viscosity was measured in the same manner as Test Example 2. The amounts of the coated ammonium persulfate particles and the coated ferric sulfate n-hydrate particles added were as shown in Table 14 (indicated as an amount of the coated particles).

TABLE 14

|  | Added amount (g) | |
| --- | --- | --- |
|  | Ammonium persulfate | Ferric sulfate n-hydrate |
| Example III-1 | 0.5 | 0.36 |
| Example III-2 | 0.5 | 0.34 |
| Comparative Example III-1 | 0.5 | — |
| Comparative Example III-2 | 0.5 | 0.37 |
| Comparative Example III-3 | 0.5 | 0.33 |

The viscosity-reducing rates were calculated between Hour 2.5 to 3.5 following addition of the gel degradation agent for Example III-1, between Hour 2 to 3 following addition of the gel degradation agent for Example III-2, and between Hour 3 to 4 following addition of the gel degradation agents for Comparative Examples III-1 and III-2. The results are shown in Table 15 below.

Example IV-1

(1) Preparation of Coating Solution (a)

The same Coating solution (a) as that in Example 1 was used.

(2) Preparation of Coated Ammonium Persulfate Particles

The same ammonium persulfate as that in Example 1 (available from Mitsubishi Gas Chemical Company, Inc., weight-based median size of 568 μm as measured by a sieving method) was used to prepare coated ammonium persulfate particles in the same manner as Example 1 except that Coating solution (a) was applied for 133 minutes under the following conditions: a supply air temperature of 50 to 60° C., a discharge air temperature of 30 to 40° C. and a spray velocity of 10 g/min. The final mass ratio of ammonium persulfate and the solid resin content in Coating solution (a) was adjusted to 5:1. The weight-based median size of the resulting coated particles was 585 μm as measured by a sieving method. In addition, the coating-film thickness was 33 μm.

(3) Preparation of Coated Ammonium Iron Sulfate Hexahydrate Particles

Ammonium iron sulfate hexahydrate (available from FUJIFILM Wako Pure Chemical Corporation) was sorted with sieves having mesh sizes of 425 to 1,180 μm (available from Tokyo Screen Co., Ltd.) to use the particles having sizes of 425 to 1,000 μm. The weight-based median size of the resulting particles was 395 μm as measured by a sieving method.

TABLE 15

|  | Viscosity (mPa·s) | | | | | | | | | | Viscosity-reducing rate (%) between |
| --- | --- | --- | --- | --- | --- | --- | --- | --- | --- | --- | --- |
|  | 0 hour later | 0.25 hours later | 0.5 hours later | 1 hour later | 1.5 hours later | 2 hours later | 2.5 hours later | 3 hours later | 3.5 hours later | 4 hours later | Hour x to (x + 1) |
| Example III-1 | 2654 | 2634 | 2500 | 2454 | 2421 | 2307 | 1902 | 962 | 238 | — | 62.7 |
| Example III-2 | 2654 | 2536 | 2443 | 2409 | 2344 | 2301 | 1444 | 211 | — | — | 78.7 |
| Comparative Example III-1 | 2654 | 2615 | 2645 | 2666 | 2580 | 2208 | 2015 | 1614 | 1320 | 416 | 45.1 |
| Comparative Example III-2 | 2654 | 2703 | 2638 | 2609 | 2455 | 2380 | 2112 | 1538 | 1080 | 389 | 43.3 |
| Comparative Example III-3 | 2654 | 2389 | 1344 | 244 | — | — | — | — | — | — | — |

1,000 g of the resulting ammonium iron sulfate hexahydrate was fed into a fluidized bed system (FLOW COATER available from Freund Corporation) to cause them to behave as a fluid, onto which Coating solution (a) prepared above was sprayed. Coating was performed for 88 minutes under the following conditions: a supply air temperature of 70 to 80° C., a discharge air temperature of 30 to 40° C. and a spray velocity of 15 g/min. The final mass ratio of ammonium iron sulfate hexahydrate and the solid resin content in Coating solution (a) was adjusted to 5:1. The weight-based median size of the resulting coated particles was 428 μm as measured by a sieving method. In addition, the coating-film thickness was 32 μm.

Example IV-2

Coated ammonium iron sulfate hexahydrate particles were prepared in the same manner as Example IV-1 except that Coating solution (a) was applied for 71 minutes at a spray velocity of 15 g/min. The final mass ratio of ammonium iron sulfate hexahydrate and the solid resin content in Coating solution (a) was adjusted to 25:4. The weight-based median size of the resulting coated particles was 421 μm as measured by a sieving method. In addition, the coating-film thickness was 16 μm.

The same coated ammonium persulfate particles as those in Example IV-1 were used.

Comparative Example IV-1

The coated ammonium persulfate particles prepared in Example IV-1 were used in the absence of the coated ammonium iron sulfate hexahydrate particles.

Comparative Example IV-2

Coated ammonium iron sulfate hexahydrate particles were prepared in the same manner as Example IV-1 except that Coating solution (a) was applied for 107 minutes at a spray velocity of 15 g/min. The final mass ratio of ammonium iron sulfate hexahydrate and the solid resin content in Coating solution (a) was adjusted to 25:6. The weight-based median size of the resulting coated particles was 496 μm as measured by a sieving method. In addition, the coating-film thickness was 37 μm.

The same coated ammonium persulfate particles as those in Example IV-1 were used.

Comparative Example IV-3

Coated ammonium iron sulfate hexahydrate particles were prepared in the same manner as Example IV-1 except that Coating solution (a) was applied for 35 minutes at a spray velocity of 15 g/min. The final mass ratio of ammonium iron sulfate hexahydrate and the solid resin content in Coating solution (a) was adjusted to 25:2. The weight-based median size of the resulting coated particles was 423 μm as measured by a sieving method. In addition, the coating-film thickness was 11 μm.

The same coated ammonium persulfate particles as those in Example IV-1 were used.

Test Example IV-1

Measurement of Gel Residue Rate

The coated ammonium persulfate particles and the coated ammonium iron sulfate hexahydrate particles prepared in each of Examples IV-1 and IV-2 and Comparative Examples IV-1 to IV-3 were added to a gel to degrade the gel and compare the gel residue rates. Specifically, the process was as follows.

(1) Preparation of Gel
The same gel as that in Test Example 1 was used.
(2) Degradation of Gel
The gel was degraded by the same process as Test Example 1. The amounts of the coated ammonium persulfate particles and the coated ammonium iron sulfate hexahydrate particles added were as indicated in Table 16 below (indicated as an amount of the coated particles).
(3) Calculation of Gel Residue Rate
The gel residue rate was calculated in the same manner as Test Example 1. The results obtained are shown in Table 16 below.

TABLE 16

|  | Coating-film thickness of ammonium persulfate (X) (μm) | Coating-film thickness of ammonium iron sulfate hexahydrate (Y) (μm) | Ratio of coating-film thicknesses (Y)/(X) | Amount of ammonium persulfate added (g) | Amount of ammonium iron sulfate hexahydrate added (g) | Gel residue rate (%) |
|---|---|---|---|---|---|---|
| Example IV-1 | 33 | 32 | 0.97 | 2.5 | 1.79 | 2.4 |
| Example IV-2 | 33 | 16 | 0.48 | 2.5 | 1.66 | 1.2 |
| Comparative Example IV-1 | 33 | — | — | 2.5 | — | 3.2 |
| Comparative Example IV-2 | 33 | 37 | 1.12 | 2.5 | 1.84 | 3.1 |
| Comparative Example IV-3 | 33 | 11 | 0.33 | 2.5 | 1.60 | 1.1 |

Test Example IV-2

Measurement of Gel Viscosity

The gel viscosity was measured in the same manner as Test Example 2. The amounts of the coated ammonium persulfate particles and the coated ammonium iron sulfate hexahydrate particles added were as shown in Table 17 (indicated as an amount of the coated particles).

TABLE 17

|  | Added amount (g) | |
| --- | --- | --- |
|  | Ammonium persulfate | Ammonium iron sulfate hexahydrate |
| Example IV-1 | 0.5 | 0.36 |
| Example IV-2 | 0.5 | 0.33 |
| Comparative Example IV-1 | 0.5 | — |
| Comparative Example IV-2 | 0.5 | 0.37 |
| Comparative Example IV-3 | 0.5 | 0.32 |

The viscosity-reducing rates were calculated between Hour 2.5 to 3.5 following addition of the gel degradation agent for Example IV-1, between Hour 2 to 3 following addition of the gel degradation agent for Example IV-2, and between Hour 3 to 4 following addition of the gel degradation agents for Comparative Examples IV-1 and IV-2. The results are shown in Table 18 below.

TABLE 18

|  | Viscosity (mPa · s) | | | | | | | | | | Viscosity-reducing rate (%) between |
| --- | --- | --- | --- | --- | --- | --- | --- | --- | --- | --- | --- |
|  | 0 hour later | 0.25 hours later | 0.5 hours later | 1 hour later | 1.5 hours later | 2 hours later | 2.5 hours later | 3 hours later | 3.5 hours later | 4 hours later | Hour x to (x + 1) |
| Example IV-1 | 2654 | 2716 | 2644 | 2511 | 2552 | 2211 | 1944 | 662 | 243 | — | 64.1 |
| Example IV-2 | 2654 | 2555 | 2516 | 2411 | 2366 | 2343 | 1114 | 214 | — | — | 80.2 |
| Comparative Example IV-1 | 2654 | 2612 | 2648 | 2633 | 2514 | 2405 | 2111 | 1588 | 1122 | 415 | 44.2 |
| Comparative Example IV-2 | 2654 | 2580 | 2633 | 2594 | 2522 | 2309 | 2088 | 1712 | 1444 | 416 | 44.8 |
| Comparative Example IV-3 | 2654 | 2450 | 1281 | 215 | — | — | — | — | — | — | — |

The above-described test results show that the degradation agent of the Examples can be used to reduce the gel residue. For example, the gel residue rate (the proportion of the amount of gel remaining after degradation of the viscous fluid with respect to the amount of gel before the viscous fluid degradation) can be made less than 3% (for example, 1% to less than 3%) or less than 2% (1% to less than 2%). Furthermore, since it can rapidly reduce the gel viscosity after maintaining the gel viscosity for a predetermined period of time, it has particularly favorable characteristics for a hydraulic fracturing method.

While some embodiments of the present invention have been described, these embodiments are provided merely as Examples and are not intended to limit the scope of the invention. These novel embodiments can be carried out in other various modes or they can have omission, replacement or modification in various ways without departing from the gist of the invention. These embodiments as well as variations thereof are included in the scope and the gist of the invention and are also included in the scope of the inventions recited in the claims and equivalents to such inventions.

The invention claimed is:

1. A degradation agent for a viscous fluid used in a hydraulic fracturing method, the agent comprising a persulfate and an iron salt as an activator of said persulfate, wherein:
each of the persulfate and the iron salt is coated; and
the ratio (Y/X) of the coating-film thickness of the iron salt (Y) to the coating-film thickness of the persulfate (X) is in the range of 0.35 to 1.0.

2. The degradation agent according to claim 1, wherein the persulfate is ammonium persulfate, sodium persulfate or potassium persulfate.

3. The degradation agent according to claim 1, wherein the iron salt is an aqueous iron salt.

4. The degradation agent according to claim 3, wherein the aqueous iron salt is ferrous sulfate, ferric sulfate, ammonium iron(II) sulfate or a hydrate thereof.

5. A viscous fluid used in a hydraulic fracturing method, the viscous fluid comprising a solvent, a gelling agent and the degradation agent according to claim 1.

6. A method for producing a degradation agent for a viscous fluid used in a hydraulic fracturing method, the method comprising:
coating a persulfate to obtain a coated persulfate;
coating an iron salt to obtain a coated iron salt; and
mixing the coated persulfate and the coated iron salt,
wherein the ratio (Y/X) of the coating-film thickness of the iron salt (Y) to the coating-film thickness of the persulfate (X) is in the range of 0.35 to 1.0.

7. The method according to claim 6, wherein the persulfate is ammonium persulfate, sodium persulfate or potassium persulfate.

8. The method according to claim 6, wherein the iron salt is an aqueous iron salt.

9. The method according to claim 8, wherein the aqueous iron salt is ferrous sulfate, ferric sulfate, ammonium iron(II) sulfate or a hydrate thereof.

10. A method for degrading a viscous fluid used in a hydraulic fracturing method, the method comprising adding a coated persulfate and a coated iron salt as an activator of said persulfate to the viscous fluid,
wherein the ratio (Y/X) of the coating-film thickness of the iron salt (Y) to the coating-film thickness of the persulfate (X) is in the range of 0.35 to 1.0.

* * * * *